(12) United States Patent
Rabasco et al.

(10) Patent No.: US 8,779,055 B2
(45) Date of Patent: Jul. 15, 2014

(54) HYDROPHOBICALLY MODIFIED ALKYLENE OXIDE URETHANE POLYMER

(75) Inventors: John J Rabasco, Allentown, PA (US); Barrett R Bobsein, Sellersville, PA (US)

(73) Assignee: Rohm and Haas Company, Philadelphia, PA (US)

( * ) Notice: Subject to any disclaimer, the term of this patent is extended or adjusted under 35 U.S.C. 154(b) by 269 days.

(21) Appl. No.: 13/295,422

(22) Filed: Nov. 14, 2011

(65) Prior Publication Data

US 2012/0130000 A1    May 24, 2012

Related U.S. Application Data

(60) Provisional application No. 61/458,197, filed on Nov. 19, 2010, provisional application No. 61/495,669, filed on Jun. 10, 2011.

(51) Int. Cl.

| | |
|---|---|
| *C08G 18/00* | (2006.01) |
| *C08G 18/08* | (2006.01) |
| *C08G 18/28* | (2006.01) |
| *C08G 18/70* | (2006.01) |
| *C08G 18/81* | (2006.01) |
| *C08L 75/00* | (2006.01) |

(52) U.S. Cl.
USPC ............ 524/590; 524/589; 528/44; 528/45; 528/65; 528/66; 528/71; 528/78; 528/85

(58) Field of Classification Search
USPC ............ 524/589, 590; 528/44, 45, 65, 66, 71, 528/78, 85
See application file for complete search history.

(56) References Cited

U.S. PATENT DOCUMENTS

| | | | |
|---|---|---|---|
| 3,462,237 A | 8/1969 | Sellet | |
| 3,519,478 A | 7/1970 | Howell, Jr. | |
| 7,057,003 B2 * | 6/2006 | Detig-Karlou et al. | ......... 528/45 |
| 7,741,402 B2 | 6/2010 | Bobsein et al. | |
| 2010/0261813 A1 | 10/2010 | Bobsein et al. | |
| 2013/0158194 A1 * | 6/2013 | Bobsein et al. | ............. 524/590 |

FOREIGN PATENT DOCUMENTS

| | | |
|---|---|---|
| EP | 1972664 A2 | 9/2008 |
| WO | 2007112503 A1 | 10/2007 |

OTHER PUBLICATIONS

J.M. Orban, et al.: "Easily Grafted Polyurethanes with Reactive Main Chain Functional Groups. Synthesis, Characterization, and Antithrombogenicity of Poly(ethylene Glycol)-Grafted Poly(Urethanes)", Journal of Polymer Science: Part A: Polymer Chemistry, vol. 37, 1999, pp. 3441-3448.

* cited by examiner

*Primary Examiner* — Patrick Niland
(74) *Attorney, Agent, or Firm* — Reid S. Willis

(57) ABSTRACT

The present invention relates to a composition comprising a hydrophobically modified alkylene oxide urethane polymer with pendant or end-capping tertiary amine groups, the conjugate acids of which have a $pK_a$ in the range of about 4.5 to about 6.5. The composition of the present invention is useful as a rheology modifier for paint formulations formulated over a wide pH range and is more stable to heat aging than higher $pK_a$ amine-modified HEURs.

9 Claims, 1 Drawing Sheet

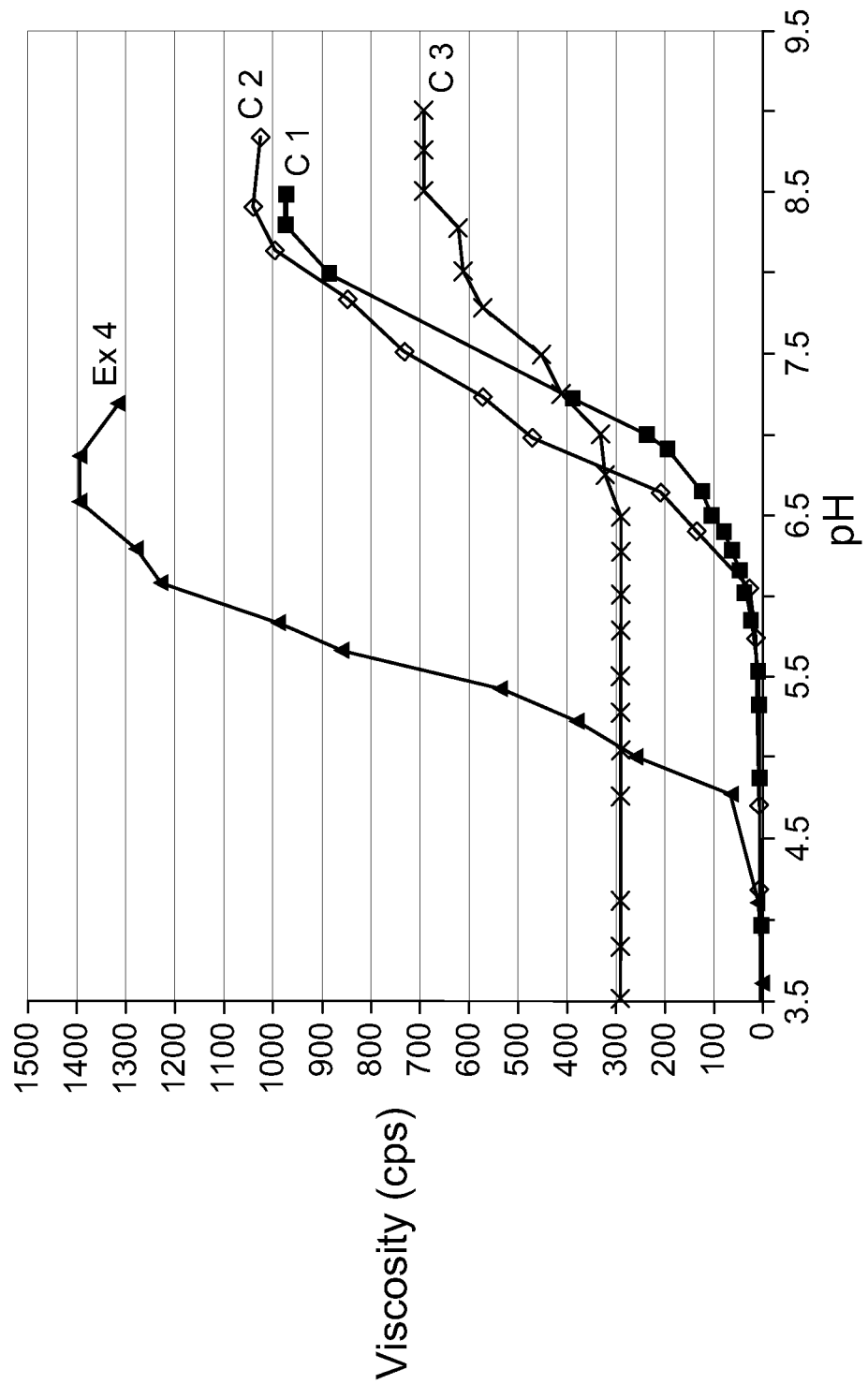

HYDROPHOBICALLY MODIFIED ALKYLENE OXIDE URETHANE POLYMER

BACKGROUND OF THE INVENTION

The present invention idea relates to amine-based hydrophobically modified alkylene oxide urethane polymers as rheology modifiers, which are especially useful in architectural coatings.

Rheology modifiers are typically designed to impart desirable rheological properties to coating formulations over a wide shear rate range. U.S. Pat. No. 7,741,402 discloses ethylene oxide urethane polymers modified with hydrophobes that contain organic bases such as secondary or tertiary amines (amine-modified HEURs), the presence of which provides for viscosity control through a pH trigger. When the pH of the HEUR composition is sufficiently low with respect to the $pK_a$ of the incorporated base, the basic groups are protonated and the viscosity is relatively low; when the pH is sufficiently high, associative thickening occurs. Thus, incorporation of basic hydrophobes into the HEUR polymer allows relatively high concentration of polymer to be dissolved in water at low pH; once the solution is added to the high pH environment of paint coatings, the base is deprotonated and the associative thickening mechanism activated.

Amine-modified HEURs can be sensitive to the pH of the paint formulation to which it is added. For example, the pH of the formulation, through time and heat aging, may decrease to a level below a critical pH conducive to associative thickening, thereby resulting in a poorer formulation; consequently, it would be desirable to discover a hydrophobe, more particularly an amine-based hydrophobe, that preserves the desired viscosity of the formulation in face of pH-lowering mechanisms.

SUMMARY OF THE INVENTION

The present invention addresses a need by providing, in a first aspect, a composition comprising a hydrophobically modified alkylene oxide urethane polymer with pendant or end-capping tertiary amine groups, the conjugate acids of which have a $pK_a$ in the range of about 4.5 to about 6.5.

In a second aspect, the present invention is a composition comprising an aqueous dispersion of a hydrophobically modified alkylene oxide urethane polymer with pendant or end-capping protonated tertiary amine groups having a $pK_a$ in the range of about 4.5 to about 6.5.

The polymer of the present invention is useful as a rheology modifier for paint formulations formulated over a wide pH range and is more stable to heat aging than higher $pK_a$ amine-modified HEURs.

BRIEF DESCRIPTION OF DRAWINGS

FIG. 1 is a viscosity versus pH profile of aqueous dispersions of HEURS containing pendant or end-capping tertiary amine groups.

DETAILED DESCRIPTION OF THE INVENTION

In a first aspect, the present invention is a composition comprising a hydrophobically modified alkylene oxide urethane polymer with pendant or end-capping tertiary amine groups, the conjugate acids of which have a $pK_a$ in the range of about 4.5 to about 6.5.

The hydrophobically modified alkylene oxide polyurethane composition of the present invention is characterized, in part, by hydrophilic polyalkylene oxide groups, examples of which include hydrophilic polyethylene oxide, hydrophilic polyethylene oxide/polypropylene oxide copolymers, and hydrophilic polyethylene oxide/polybutylene oxide copolymers. A preferred hydrophobically modified alkylene oxide polyurethane is a hydrophobically modified ethylene oxide polyurethane (HEUR).

The composition of the present invention is further characterized by the inclusion of hydrophobic pendant or end-capping tertiary amine groups, the conjugate acids of which have a $pK_a$ in the range of about 4.5 to 6.5, preferably in the range of 5.2 to 6.5.

Preferred pendant or end-capping hydrophobic amine groups are mono- or dihydroxyalkylated dibenzylamine groups or monobenzyldi(alkyleneoxy)amino groups, as illustrated:

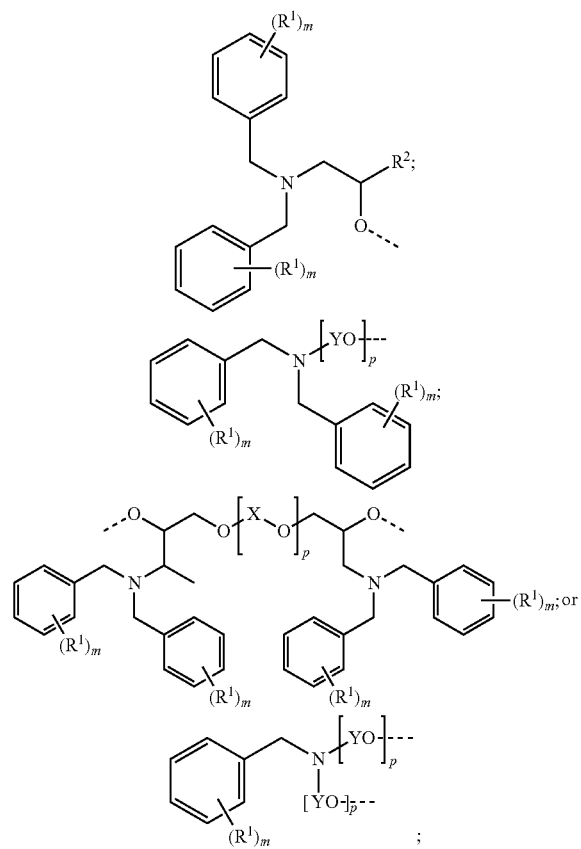

where each $R^1$ is independently a $C_1$-$C_6$-carbon-containing substituent, preferably $C_1$-$C_6$-alkyl, $C_1$-$C_6$-alkoxy, or $C_1$-$C_6$-alkyl-$C_1$-$C_6$-alkoxy;
$R^2$ is H, $C_1$-$C_{20}$-alkyl, or $CH_2$—$OR^3$, wherein $R^3$ is H, $C_1$-$C_{20}$-alkyl, aryl, or $C_1$-$C_{20}$-alkylaryl;
X is $C_1$-$C_{20}$-alkylene, arylene, or aralkylene;
each Y is independently $C_3$-$C_8$-alkylene or $CH_2CHR^4$; wherein
each $R^4$ is independently H, $C_1$-$C_{12}$-alkyl, phenyl, naphthyl, $C_1$-$C_{12}$-alkyl-phenyl-; $C_1$-$C_{12}$-alkyl-naphthyl-; or $CH_2OR^5$, where $R^5$ is $C_1$-$C_{12}$-alkyl, phenyl, naphthyl, $C_1$-$C_{12}$-alkyl-phenyl-; $C_1$-$C_{12}$-alkyl-naphthyl-;
each m is independently 0, 1, or 2; preferably 0 or 1; more preferably m is 0; and
p is 1 to 50, preferably 1 to 20, with the proviso that X is $C_2$-$C_8$-alkylene when p is 2 to 50; and X is $C_1$-$C_{20}$-alkylene, arylene, or aralkylene when p is 1.

By definition, where Y is $CH_2CHR^4$, YO is $-CH_2CHR^4O-$.

Examples of $C_1$-$C_6$-carbon containing substituents include methyl, ethyl, n-propyl, isopropyl, n-butyl, n-pentyl, n-hexyl, methoxy, ethoxy, methoxymethyl, ethoxymethyl, methoxyethyl, and ethoxyethyl.

Examples of arylene groups are phenylene and naphthalendiyl groups:

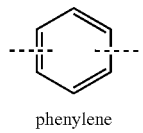
phenylene
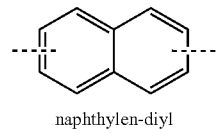
naphthylen-diyl

As used herein, the term "alkyl" refers to a linear or branched hydrocarbon radical where alkyl is $C_1$-$C_{20}$; and linear, branched, or cyclic hydrocarbon radical where alkyl is $C_3$-$C_{20}$. Similarly, the term "alkylene" refers to linear or branched hydrocarbon biradical where alkylene is $C_1$-$C_{20}$; and linear, branched or cyclic hydrocarbon biradical where alkylene is $C_3$-$C_{20}$.

Examples of a suitable aralkylenes group include:

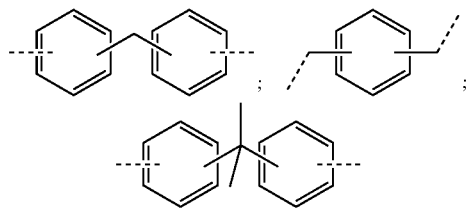

Examples of preferred YO groups are $-CH_2CH_2O-$, $-CH_2CH_2CH_2O-$, $-CH_2CH(CH_3)O-$, $-CH_2CH(CH_2CH_3)O-$, $-CH_2CH_2CH_2CH_2O-$, and:

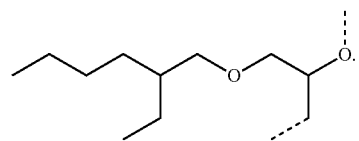

and combinations thereof. Similarly, examples of preferred $C_2$-$C_8$-alkylene groups are $C_2$-$C_4$-alkylene groups.

Examples of more preferred hydrophobic groups are illustrated:

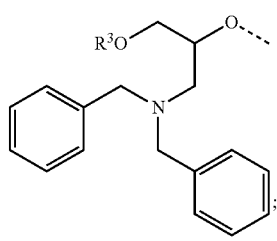
I

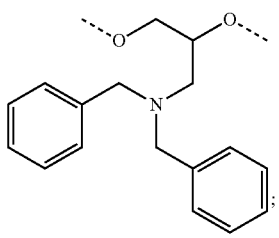
II

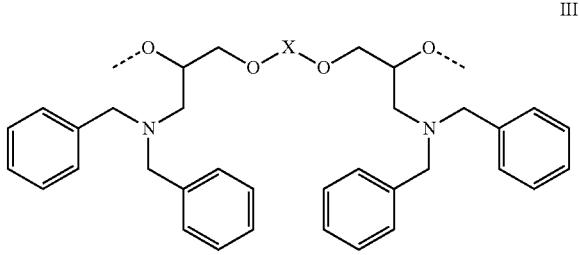
III

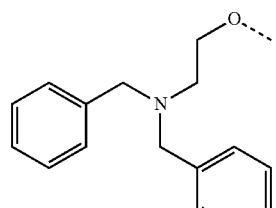
IV

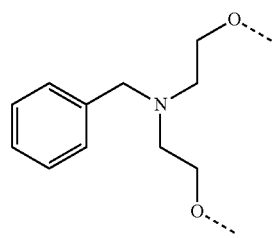
V

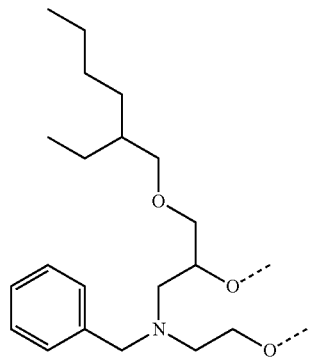
VI where $R^3$ is n-butyl, isobutyl, ethylhexyl, tridecyl, phenyl, or naphthyl;

X is $-(CH_2)_4-$; $-CH_2C(CH_3)_2CH_2-$;

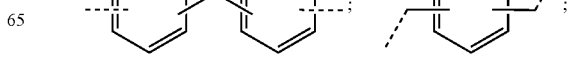

-continued

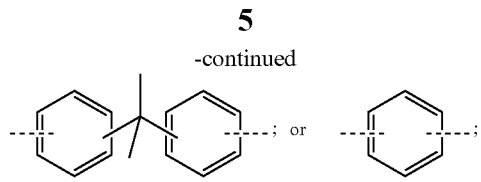

and the dashed lines represents the points of attachment of the X group.

The hydrophobic polymer of the present invention is conveniently prepared by contacting together under reactive conditions a) at least one hydrophobic compound which is a mono- or dihydroxyalkylated tertiary amine characterized by having a conjugate acid with a plc in the range of 4.5 to 6.5; b) a diisocyanate; and c) a water-soluble polyalkylene glycol.

A preferred hydrophobic compound has any of the following formulas:

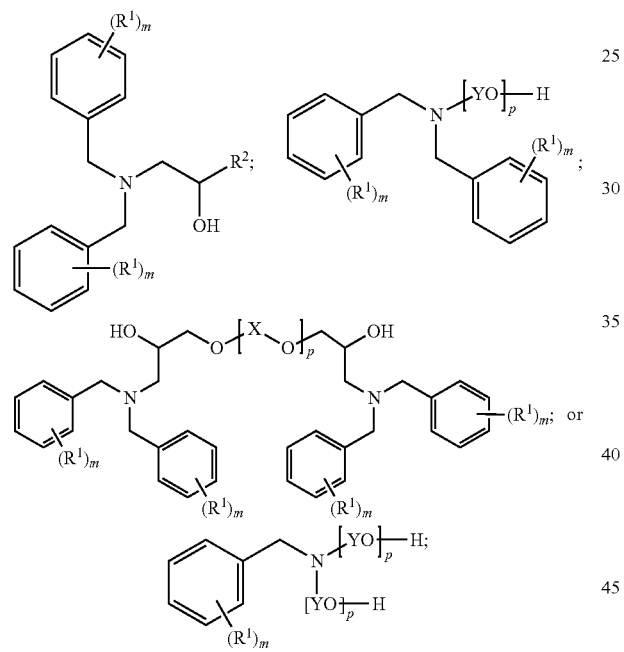

where $R^1$, $R^2$, X, Y, m, and p are as previously defined. More preferred hydrophobic compounds have the following structures:

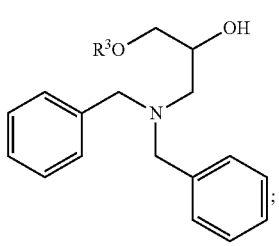

Ia

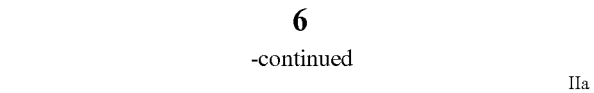

IIa

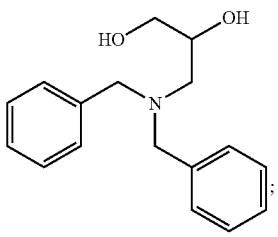

IIIa

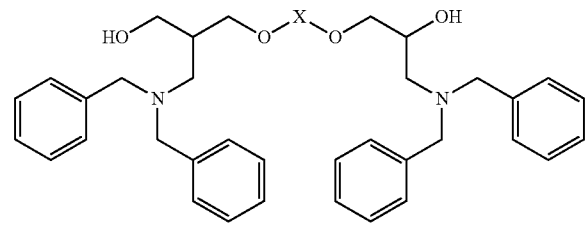

IVa

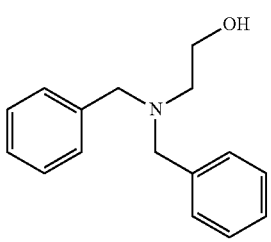

Va

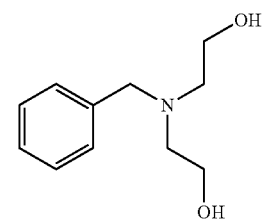

VIa

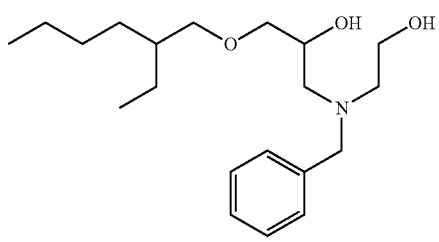

where $R^3$ is n-butyl, isobutyl, ethylhexyl, tridecyl, phenyl, or naphthyl; and X is $-(CH_2)_4-$;

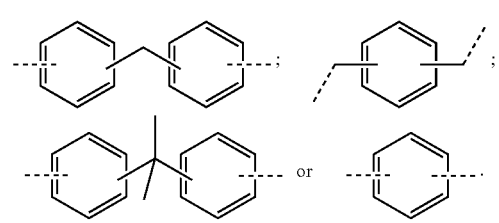

The pendant or end-capping hydrophobic groups are conveniently incorporated into the polymer by reaction of the corresponding hydrophobic alcohol or diol with isocyanate groups to form urethane linkages. When the hydrophobe is a mono-alcohol, the group becomes an end-capping group; when the hydrophobe is a diol, the hydrophobe becomes a pendant group.

The diisocyanate starting material is a $C_4$-$C_{20}$ aliphatic or aromatic diisocyanate. As used herein, "aliphatic" refers to saturated or partially unsaturated linear-, branched-, or cycloaliphatic, or combinations thereof. Examples of suitable diisocyanates include 1,4-tetramethylene diisocyanate, 1,6-hexamethylene diisocyanate, 2,2,4-trimethyl-1,6-diisocyanatohexane, 1,10-decamethylene diisocyanate, 4,4'-methylenebis(isocyanatocyclohexane), 1,4-cyclohexylene diisocyanate, 1-isocyanato-3-isocyanatomethyl-3,5,5-trimethylcyclohexane, m- and p-phenylene diisocyanate, 2,6- and 2,4-toluene diisocyanate, xylene diisocyanate, 4-chloro-1,3-phenylene diisocyanate, 4,4'-biphenylene diisocyanate, 4,4'-methylene diphenylisocyanate, 1,5-naphthylene diisocyanate, and 1,5-tetrahydronaphthylene diisocyanate.

A water-soluble polyalkylene glycol refers to water-soluble polyethylene oxides, water-soluble polyethylene oxide/polypropylene oxide copolymers, and water-soluble polyethylene oxide/polybutylene oxide copolymers. As used herein, the term propylene oxide refers to either a polymer having —($OCH_2CH_2CH_2$)— and/or —($OCH(CH_3)CH_2$)— repeating groups.

Preferred water-soluble polyalkylene oxides are polyethylene glycols, particularly polyethylene glycols having a weight average molecular weight in the range of from 4000, more preferably from 6000, and most preferably from 7000 to 20,000, more preferably to 12,000 and most preferably to 9000 Daltons. An example of a suitable polyethylene glycol is PEG 8000, which is commercially available as CARBOWAX™ 8000 Polyethylene Glycol (a trademark of The Dow Chemical Company ("Dow") or an affiliate of Dow, Midland, Mich.).

The water soluble polyalkylene oxides may, alternatively, be linked with polyfunctional groups other than polyisocyanates to form non-urethane compositions that can benefit by tertiary amine-modification as described herein. Examples of suitable alternative linker groups include epihalohydrins, gem dihalides, and aminoplasts.

In a second aspect, the present invention is a composition comprising an aqueous dispersion of a hydrophobically modified alkylene oxide urethane polymer with pendant or end-capping protonated tertiary amine groups having a $pK_a$ in the range of about 4.5 to about 6.5. The protonated tertiary amine groups (i.e., the conjugate acid of the tertiary amine groups) are conveniently prepared by adding the hydrophobically modified alkylene oxide urethane polymer to sufficient amount of a sufficiently strong Bronsted acid to protonate the amine groups. Examples of suitable acids include gluconic acid, acetic acid, citric acid, lactic acid, phosphoric acid, sulfamic acid, hydrochloric acid, sulfuric acid, and polyacrylic acids. The following structures illustrate preferred protonated tertiary amine groups of this aspect of the invention:

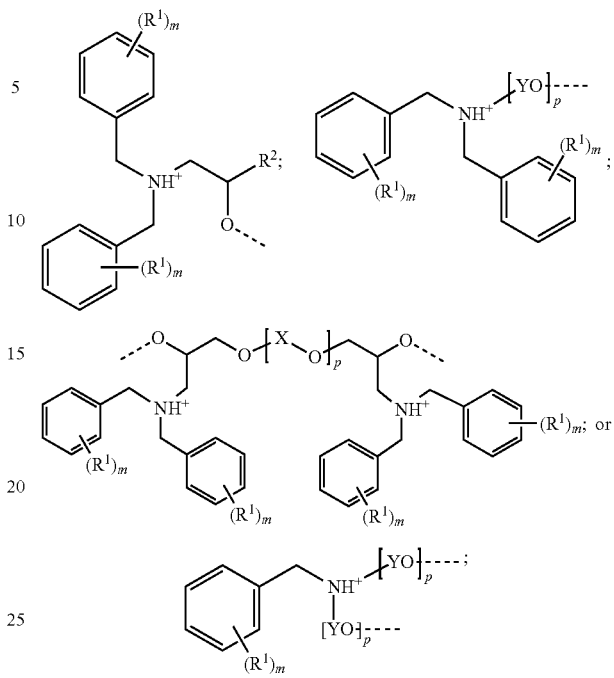

where $R^1$, $R^2$, X, Y, m, and p are as previously defined.

More preferred protonated tertiary amine groups are illustrated:

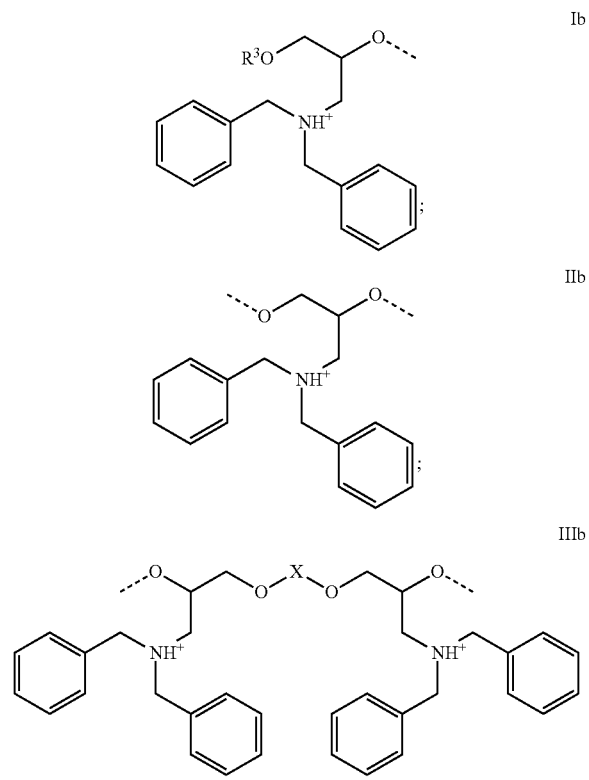

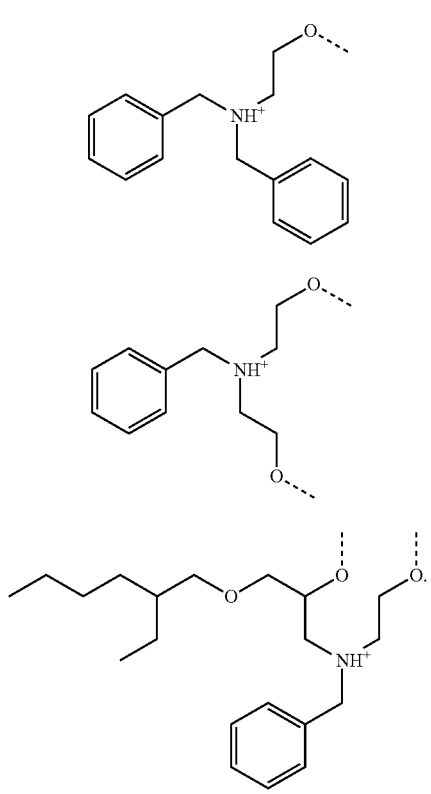

The aqueous dispersion of this aspect of the present invention preferably includes from 10 to 50 weight percent of the hydrophobically modified alkylene oxide urethane polymer, based on the weight of water and the polymer.

The coating composition according to the present invention may further include one or more of the following additives: Solvents; fillers; pigments, such as titanium dioxide, mica, calcium carbonate, silica, zinc oxide, milled glass, aluminum trihydrate, talc, antimony trioxide, fly ash, and clay; polymer encapsulated pigments, such as polymer-encapsulated or partially encapsulated opacifying pigment particles including titanium dioxide, zinc oxide, or lithopone polymers; polymers or polymer emulsions adsorbing or bonding to the surface of pigments such as titanium dioxide; hollow pigments, including pigments having one or more voids; dispersants, such as aminoalcohols and polycarboxylates; surfactants; defoamers; preservatives, such as biocides, mildewcides, fungicides, algaecides, and combinations thereof; flow agents; leveling agents; and additional neutralizing agents, such as hydroxides, amines, ammonia, and carbonates.

For example, the coatings composition may include polymer-encapsulated opacifying pigment particles comprising i) opacifying pigment particles, such as titanium dioxide particles, having a diameter in the range of 100 nm to 500 nm and an index of refraction of at least 1.8; ii) an encapsulating polymer, and iii) a polymeric dispersant for the encapsulated opacifying pigment particles and the polymer. Such polymer-encapsulated opacifying pigment particles are described, for example, in U.S. Patent Publication US 2010/0298483 A1. In another example, the coating composition may include polymer-encapsulated opacifying pigment particles as described in WO 2007/112503A1.

EXAMPLES

The following examples are for illustrative purposes only and are not intended to limit the scope of the invention.

Intermediate 1

Dibenzylamine (424 g), butyl glycidyl ether (307 g) and water (20 g) were heated to reflux (105-115° C.) under a nitrogen atmosphere in a round bottom flask equipped with a condenser and mechanical stirrer. After 6 h, the mixture was cooled to 30° C. Product was isolated after water and residual butyl glycidyl ether were removed in vacuo (15 mm Hg) over a temperature range of 30-150° C.

Intermediate 2

Dibenzylamine (338 g) and phenyl glycidyl ether (258.3 g) were heated to 120° C. under a nitrogen atmosphere in a round bottom flask equipped with a condenser and mechanical stirrer. After 10 h, the mixture was cooled to 30° C. and the product isolated without purification.

Intermediate 3

Dibenzylamine (136.2 g) and naphthyl glycidyl ether (149.7 g) were heated to 120° C. under a nitrogen atmosphere in a round bottom flask equipped with a condenser and mechanical stirrer. After 5 h, the mixture was cooled to 30° C. and the product isolated without purification.

Intermediate 4

Dibenzylamine (400 g) and 1,4-butanediol diglycidyl ether (263 g) were heated to 125° C. under a nitrogen atmosphere in a round bottom flask equipped with a condenser and mechanical stirrer. After 6 h, the mixture was cooled to 30° C. and the product isolated without purification.

Intermediate 5

Dibenzylamine (150.6 g) and polyethylene glycol diglycidyl ether (epoxy equivalent weight=275; 214 g) were heated to 125° C. under a nitrogen atmosphere in a round bottom flask equipped with a condenser and mechanical stirrer. After 10 h, the mixture was cooled to 30° C. and the product isolated without purification.

Intermediate 6

Dibenzylamine (297 g) and diethylene glycol diglycidyl ether (226.6 g) were heated to 120° C. under a nitrogen atmosphere in a round bottom flask equipped with a condenser and mechanical stirrer. After 4 h, the product was purified via vacuum distillation (max temperature=190° C.; 10 mm Hg) to remove unreacted dibenzylamine.

Intermediate 7

Dibenzylamine (410.4 g) was heated to 100° C. under a nitrogen atmosphere in a round bottom flask equipped with a condenser, addition funnel, and mechanical stirrer. Glycidol (158 g) was added dropwise to the reactor over 2 h with vigorous stirring. After completing the glycidol addition, stirring was continued for 1 h. The product was purified via vacuum distillation.

Intermediate 8

Bis(2-ethylhexyl)amine (2010.0 g) was heated to 110° C. under a nitrogen atmosphere in a round bottom flask equipped with a condenser, addition funnel, and mechanical stirrer. Glycidol (685 g) was added dropwise to the reactor over 2 h with vigorous stirring. After completing the glycidol addition, stirring was continued for 1 h. The product was purified via vacuum distillation (165-175° C.; 1.0 mm Hg).

Intermediate 9

Diamylamine (372.4 g), butyl glycidyl ether (346.2 g) and water (27 g) were heated to reflux (105-115° C.) under a nitrogen atmosphere in a round bottom flask equipped with a condenser and mechanical stirrer. After 5 h, the mixture was cooled to 30° C. Product was isolated after water and residual butyl glycidyl ether were removed via vacuum distillation (14 mm Hg) over a temperature range of 30-150° C.

Intermediate 10

N-Benzylethanolamine (200.6 g) and 2-ethylhexyl glycidyl ether (250.0 g) were heated to 100° C. under a nitrogen atmosphere in a round bottom flask equipped with a condenser and mechanical stirrer. After stirring for 3 h, the reaction mixture was cooled to room temperature. The resulting diol product was used without further purification.

Example 1

Preparation of HEUR Polymer based on Intermediates 1 and 4

CARBOWAX™ 8000 Polyethylene Glycol (a trademark of the Dow Chemical Company, molecular weight 8200; 1255.8 g) was heated to 110° C. under vacuum in a batch melt reactor for 2 h. Intermediate 4 (54.58 g) and Intermediate 1 (11.98 g) were added to the reactor and allowed to mix for 5 min. Isophorone diisocyanate (IPDI, 55.89 g) was then added to the reactor and mixing was continued for 5 min. Bismuth octoate solution (28%, 3.14 g) was then added to the reactor and the temperature of the mixture was maintained at 110° C. with stirring for 20 min. The resulting molten polymer was removed from the reactor and cooled. Following the procedure described herein, the $pK_a$ for this polymer was found to be 6.2.

Example 2

Preparation of HEUR Polymer Based on Intermediates 1 and 5

CARBOWAX™ 8000 Polyethylene Glycol (molecular weight 8200; 1715.8 g) was heated to 110° C. under vacuum in a batch melt reactor for 2 h. Intermediate 5 (73.39 g) and Intermediate 1 (47.05 g) were added to the reactor and allowed to mix for 5 min. IPDI (76.37 g) was then added to the reactor and mixing was continued for 5 min. Bismuth octoate solution (28%, 4.29 g) was then added to the reactor. The mixture was held at 110° C. with stirring for 20 min. The resulting molten polymer was removed from the reactor and cooled. Following the procedure described herein, the $pK_a$ for this polymer was found to be 6.0.

Example 3

Preparation of HEUR Polymer based on N-Benzyldiethanolamine, Intermediate 1, and IPDI CARBOWAX™ 8000 Polyethylene Glycol (molecular weight 8200; 1860.5 g) was heated to 110° C. under vacuum in a batch melt reactor for 2 h. N-Benzyldiethanolamine (32.16 g) and Intermediate 1 (40.3 grams) were added to the reactor and allowed to mix for 5 min. IPDI (94.04 g) was then added to the reactor and mixing was continued for 5 min. Bismuth octoate solution (28%, 4.65 g) was then added to the reactor. The mixture was then held at 110° C. with stirring for 12 min. The resulting molten polymer was removed from the reactor and cooled. Following the procedure described herein, the $pK_a$ for this polymer was found to be 5.9.

Example 4

Preparation of HEUR Polymer based on N-Benzyldiethanolamine, Intermediate 1, and Bis-(4-isocyanotocyclohexyl)methane CARBOWAX™ 8000 Polyethylene Glycol (molecular weight 8200; 1842.3 grams) was heated to 110° C. under vacuum in a batch melt reactor for 2 h. N-Benzyldiethanolamine (32.97 g) and Intermediate 1 (46.47 g) were added to the reactor and allowed to mix for 5 min. Desmodur W diisocyanate (113.6 g) was then added to the reactor and mixing was continued for 5 min.

Bismuth octoate solution (28%, 4.61 grams) was then added to the reactor. The mixture was then held at 110° C. with stiffing for 12 min. The resulting molten polymer was removed from the reactor and cooled. Following the procedure described herein, the $pK_a$ for this polymer was found to be 5.5.

Example 5

Preparation of HEUR Polymer Based on Intermediates 1 and 6

CARBOWAX™ 8000 Polyethylene Glycol (molecular weight 8200; 1742.1 g) was heated to 110° C. under vacuum in a batch melt reactor for 2 h. Intermediate 6 (87.77 g) and Intermediate 1 (16.62 g) were added to the reactor and allowed to mix for 5 min. IPDI (77.54 g) was then added to the reactor and mixing was continued for 5 min. Bismuth octoate solution (28%, 4.36 g) was then added to the reactor. The mixture was then held at 110° C. with stirring for 15 min. The resulting molten polymer was removed from the reactor and cooled. Following the procedure described herein, the $pK_a$ for this polymer was found to be 6.1.

Example 6

Preparation of HEUR Polymer Based on Dibenzylaminoethanol and Intermediate 7

A mixture of CARBOWAX™ 8000 Polyethylene Glycol (200 grams) and toluene (340 g) were added to a vessel and dried by azeotropic distillation. The mixture was cooled to 90° C. and Intermediate 7 (3.31 g) was added to the mixture. The mixture was stirred for 5 min, after which time Desmodur W diisocyanate (11.73 g) was added following by another 5 min of stiffing. Dibutyltin dilaurate (0.21 g) was added and the mixture stirred for 1 h. After cooling to 80° C., dibenzylaminoethanol (4.9 g) was then added to the mixture and stirring was continued for an additional 1 h. The polymer was isolated by cooling the mixture to 60° C. and removing solvent in vacuo. Following the procedure described herein, the $pK_a$ for this polymer was found to be 6.1.

Example 7

Preparation of HEUR Polymer Based on Intermediate 10

CARBOWAX™ 8000 Polyethylene Glycol (molecular weight 8200; 1737.4 g) was heated to 110° C. under vacuum in a batch melt reactor for 2 h. After removing the vacuum, Intermediate 10 (69.2 g) was added to the reactor and allowed to mix for 5 min. IPDI (83.57 g) was then added to the reactor and mixing was continued for 5 min. Bismuth octoate solution (28%, 4.34 g) was then added to the reactor. The mixture was then held at 110° C. with stirring for 10 min. The resulting molten polymer was removed from the reactor and cooled. Following the procedure described herein, the $pK_a$ for this polymer was found to be 5.2.

Comparative Example 1

Preparation of HEUR Polymer Based on Bis(2-ethylhexyl)aminoethanol

CARBOWAX™ 8000 Polyethylene Glycol (molecular weight 8200; 1709.8 g) was heated to 110° C. under vacuum in a batch melt reactor for 2 h. The reaction mixture was then cooled to 85° C., after which time bis(2-ethylhexyl)aminoethanol (91.58 g) was added and stirring continued for 5 minutes. IPDI (78.44 g) was then added to the reactor and mixing was continued for 5 min.

Bismuth octoate solution (28%, 4.27 g) was then added to the reactor. The mixture was then held at 85° C. with stirring for 20 min. The resulting molten polymer was removed from the reactor and cooled Following the procedure described herein, the $pK_a$ for this polymer was found to be 7.5.

Comparative Example 2

Preparation of HEUR Polymer Based on Bis(2-ethylhexyl)aminoethanol

CARBOWAX™ 8000 Polyethylene Glycol (molecular weight 8200; 1844.0 g) was heated to 110° C. under vacuum in a batch melt reactor for 2 h. Intermediate 8 (31.54 g) and Intermediate 9 (19.74 g) were added to the reactor and allowed to mix for 5 minutes. IPDI (76.38 grams) was then added to the reactor and mixing was continued for 5 minutes. Bismuth octoate solution (28%, 4.40 grams) was then added to the reactor. The mixture was then held at 110° C. with stirring for 12 min. The resulting molten polymer was removed from the reactor and cooled. Following the procedure described herein, the $pK_a$ for this polymer was found to be 7.1

Comparative Example 3

Preparation of HEUR Polymer Based on N-benzyl-N-methyl-ethanolamine

A mixture of CARBOWAX™ 8000 Polyethylene Glycol (150 g) and toluene (340 g) were added to a vessel and dried by azeotropic distillation. The mixture was cooled to 90° C. whereupon Desmodur W (7.54 g) was added followed by stirring for 5 min. Dibutyltin dilaurate (0.21 g) was added and the mixture stirred for an additional 1 h. After cooling to 80° C., N-benzyl-N-methyl-ethanolamine (4.32 g) was added to the mixture and stiffing was continued for an additional 1 h. The mixture was cooled to 60° C. and the polymer was isolated by way of rotary evaporation. This thickener showed unacceptable thickening efficiency as illustrated by FIG. 1, which shows that a 20% solution by weight had to be prepared to show any significant difference in viscosity. Following the procedure described herein, the $pK_a$ for this polymer was found to be 7.1.

Preparation of an Aqueous Dispersion of the Hydrophobic Polymer and $pK_a$ Determination An acidic aqueous dispersion of the hydrophobic polymer is conveniently prepared by dispersing the hydrophobic polymer into water and a suitable acid to form a homogeneous mixture. The $pK_a$ of the conjugate acid of the pendant or end-capping tertiary amine groups can then be measured by the following general method: ~25 g of hydrophobically modified polymer (thickener) is dispersed homogeneously in ~975 g of water and sufficient phosphoric acid to provide 1000 g of aqueous composition with a thickener solids content of 2.5% and a pH=4. A mechanical stirrer, a pH meter probe, and a Brookfield viscometer are mounted over the vessel to provide simultaneous agitation, and pH and viscosity measurement of the aqueous dispersion. Temperature is held at ~25° C. and the stirrer is turned off while pH and viscosity measurements are recorded.

The pH of the aqueous composition is increased stepwise with 10% aqueous ammonia until a maximum pH of ~10.5 is obtained. After each aliquot of ammonia is added, the composition is stirred for 5 minutes, and pH and viscosity are measured. Viscosity in centipoise is measured at 60 rpm and spindle #3 of the Brookfield LV viscometer, although more viscous titrations may require 60 rpm or lesser speeds with spindle #4 of the Brookfield LV viscometer to keep the viscometer readout on scale. The viscosity is plotted on a linear scale versus the pH on a linear scale. At low and high pH values, the viscosity of the aqueous composition is relatively independent of pH. At intermediate pH values near or at the $pK_a$, the viscosity is dependent upon pH. The viscosity value at the high pH end of titration curve where the viscosity starts to become relatively independent of pH is assigned as the maximum viscosity value. The point on the titration curve corresponding to half of the maximum viscosity value is defined as the $pK_a$ of the conjugate acid of pendant or end-capping tertiary amine groups and, by extension, the $pK_a$ of the mono- or dihydroxyalkylated tertiary amine used to make these hydrophobic groups.

Detailed Description of the Figure

FIG. 1 shows a pH versus viscosity profile of aqueous dispersions of Example 4 (Ex 4, 2.0 wt %×0.50) and comparative examples 1 (C1, 2.5 wt. %×0.01), 2 (C2, 2.5 wt. %×0.10), and 3 (C3, 20 wt %), by which $pK_a$ values are measured. The FIGURE illustrates that the viscosities of the comparative examples are all above 7.0. As the heat-age stability studies below show, Example 4, a thickener of the present invention with a $pK_a$ of 5.5, demonstrates a dramatic improvement in heat age stability as compared to the higher $pK_a$ thickeners not within the scope of this invention.

Heat Age Stability Studies

Heat age stabilities of thickened paints were evaluated in a satin white formulation. The satin white formulation had a pigment volume concentration of 40.5% and a total solids concentration of 38.0% by volume. The major binder in the formulation was ROVACE™ 661 Poly(vinyl acetate) Binder (A Trademark of The Dow Chemical Company or its Affiliates, 30.3 weight % of wet binder of the weight of wet paint formulation). The formulation also contained RHOPLEX™ SG-10M Acrylic Copolymer Emulsion (A Trademark of The Dow Chemical Company or its Affiliates, 4.1 weight % of wet emulsion of the weight of wet paint formulation). Paints comprising poly(vinyl acetate) binders with an initial pH of about 9 are known to decrease in pH upon aging because of hydrolysis of the acetate group. An initial paint pH of about 9 can facilitate colloidal and biocide stability of the paint. Paint pH typically decreases to about pH 7 upon aging whereupon the rate of hydrolysis slows dramatically. Heat aging is typically employed in lab studies to accelerate the effects of paint aging. A large viscosity drop upon aging is undesirable.

Table 1 shows heat age stability of thickeners of the present invention compared to thickeners having high $pK_a$ amine hydrophobes (Comparative Examples 1 and 2) and a non-acid suppressible thickener (ACRYSOL™ SCT-275). Use Level (%) is the concentration of thickener used in the paint. The concentration is expressed as the weight percent of dry active thickener per wet weight of final paint. Example 1-7 thickeners and the Comparative Example thickeners were added as 16 weight % active thickener dispersions in water. These aqueous thickener dispersions also contained 3% wet weight of lactic acid, as supplied. The lactic acid obtained from Aldrich Chemical was supplied at 85% solids. The thickener dispersions were made by combining the dry thickener solid, water and lactic acid in a sealed plastic 50-mL centrifuge tube, and slowly rotating the mixture for two days to fully homogenize the thickener solid. The HEUR of Comparative Example 3 is a very poor thickener and was not suitable for making an acceptable paint. Therefore, heat age stability testing was not conducted on this comparative example.

pH1 is the initial pH of the paint measured one hour after each paint was formulated. Ammonia was used to adjust the pH to the value shown.

Stormer 1 is the initial Stormer viscosity, in Krebs Units, of the paints measured at 25° C. in half pint metal cans. Stormer 1 was measured 24 h after paint formulation. The paint was maintained at 25° C. during this equilibration time. Just prior to measuring the Stormer viscosity, the paints were poured into a half pint metal can and stirred with a tongue depressor for 20 s. The Krebs viscometer is a rotating paddle viscometer that is compliant with ASTM-D562. KU viscosity was measured on a Brookfield Krebs Unit Viscometer KU-1+ available from Brookfield Engineering Labs (Middleboro, Mass., USA).

pH2 is the paint pH after the paints were stored for 2 weeks in a 60° C. oven. The paints were stored in sealed metal cans during the heat aging process.

Stormer2 is the final Stormer viscosity, in Krebs Units, of the heat aged paints measured at 25° C. in half pint metal cans. Just prior to measuring the Stormer viscosity, the paints were stirred vigorously with a tongue depressor for 20 s.

Delta Stormer, in Krebs Units, is equal to Stormer2 minus Stormer1. A value of Delta Stormer that is less negative, that is, closer to zero, is desirable.

ACRYSOL™ SCT-275 refers to ACRYSOL™ SCT-275 Polyurethane Associative Thickener (A Trademark of The Dow Chemical Company or its Affiliates), the hydrophobes of which are not acid suppressible (they do not contain amine groups). The as-is viscosity of the product is suppressed by the use of a butyl carbitol-water co-solvent mixture.

Paints thickened with Examples 1-7 exhibit much less viscosity drop upon aging than paints thickened with Comparative Examples 1 and 2. The viscosity drops upon aging exhibited by paints thickened with Examples 1-7 are similar to or better than the viscosity drop of a paint thickened with ACRYSOL™ SCT-275 thickener; however, this commercial thickener disadvantageously contributes VOC to the paint.

TABLE 1

Heat Age Stability Study

| Thickener | Use Level (%) | pH 1 | Stormer1 | pH 2 | Stormer2 | Delta Stormer |
|---|---|---|---|---|---|---|
| Example 1 | 0.45 | 9.0 | 109 | 7.8 | 99 | −10 |
| Example 2 | 0.70 | 9.0 | 98 | 8.2 | 92 | −6 |
| Example 3 | 0.72 | 9.0 | 106 | 8.1 | 96 | −10 |
| Example 4 | 0.34 | 9.1 | 103 | 8.2 | 100 | −3 |
| Example 5 | 0.44 | 9.0 | 110 | 8.0 | 100 | −10 |
| Example 6 | 0.42 | 9.1 | 98 | 7.9 | 92 | −6 |
| Example 7 | 0.41 | 9.1 | 94 | 8.1 | 82 | −12 |
| Comparative Example 1 | 0.51 | 9.1 | 95 | 8.1 | 73 | −22 |
| Comparative Example 2 | 0.40 | 9.0 | 111 | 8.2 | 81 | −30 |
| ACRYSOL ™ SCT-275 | 0.41 | 9.0 | 109 | 8.1 | 96 | −12 |

What is claimed is:

1. A composition comprising a hydrophobically modified alkylene oxide urethane polymer with pendant or end-capping tertiary amine groups, the conjugate acids of which have a $pK_a$ in the range of about 4.5 to about 6.5, wherein the tertiary amine groups are mono- or dihydroxyalkylated dibenzylamine groups.

2. The composition of claim 1 wherein the hydrophobically modified alkylene oxide urethane polymer is a hydrophobically modified ethylene oxide urethane polymer (HEUR) and wherein the conjugate acids of the tertiary amine groups have a $pK_a$ in the range of about 5.2 to about 6.5.

3. The composition of claim 1 wherein the mono- or dihydroxyalkylated dibenzylamine groups are represented by any of the following structures:

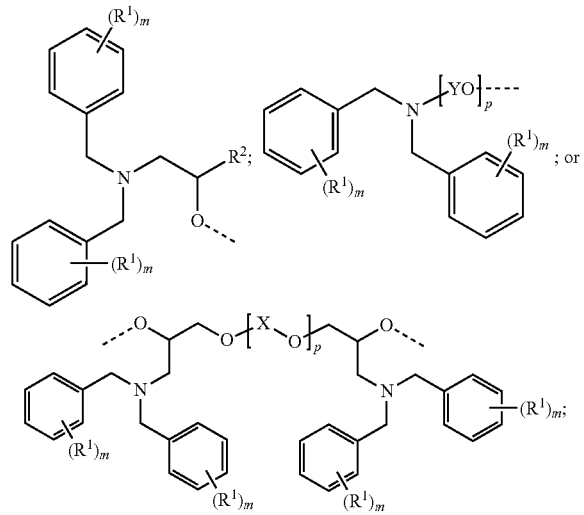

wherein the dashed lines of the structures are the points of attachment
where each $R^1$ is independently $C_1$-$C_6$-alkyl, $C_1$-$C_6$-alkoxy, or $C_1$-$C_6$-alkyl-$C_1$-$C_6$-alkoxy;

$R^2$ is H, $C_1$-$C_{20}$-alkyl, or $CH_2$—$OR^3$, wherein $R^3$ is H, $C_1$-$C_{20}$-alkyl, or aryl;

X is $C_1$-$C_{20}$-alkylene, arylene, or aralkylene;

each Y is independently $C_3$-$C_8$-alkylene or $CH_2CHR^4$; wherein each $R^4$ is independently H, $C_1$-$C_{12}$-alkyl, phenyl, naphthyl, $C_1$-$C_{12}$-alkyl-phenyl-; $C_1$-$C_{12}$-alkyl-naphthyl-; or $CH_2OR^5$, where $R^5$ is $C_1$-$C_{12}$-alkyl, phenyl, naphthyl, $C_1$-$C_{12}$-alkyl-phenyl-; $C_1$-$C_{12}$-alkyl-naphthyl-;

each m is independently 0, 1, or 2; and p is 1 to 50, with the proviso that X is $C_2$-$C_8$-alkylene when p is 2 to 50; and X is $C_1$-$C_{20}$-alkylene, arylene, or aralkylene when p is 1.

4. The composition of claim 3 wherein the mono- or dihydroxyalkylated dibenzylamine groups are represented by any of the following structures:

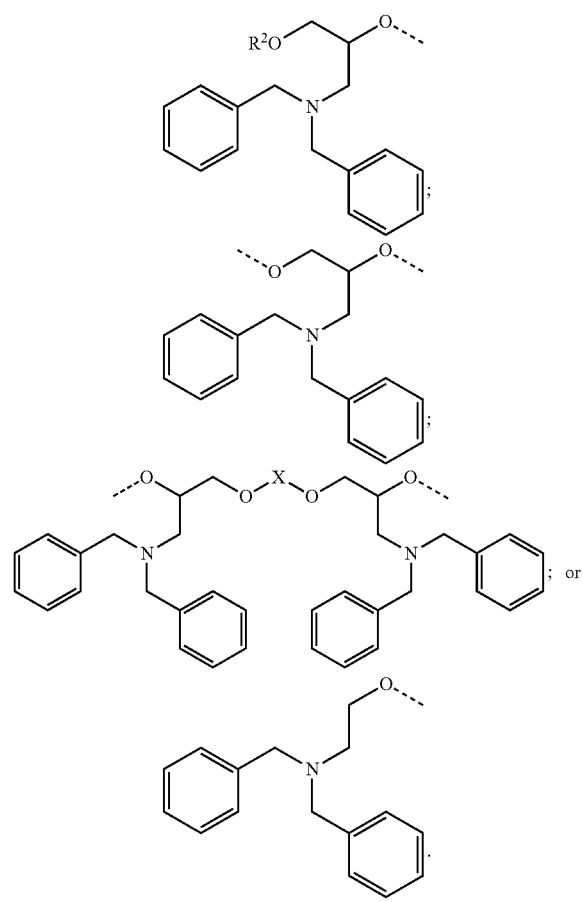

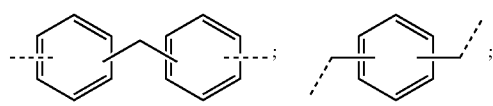

wherein the dashed lines of the structures are the points of attachment where $R^3$ is n-butyl, isobutyl, ethylhexyl, tridecyl, phenyl, or naphthyl; and X is —$(CH_2)_4$—; —$CH_2C(CH_3)_2CH_2$—;

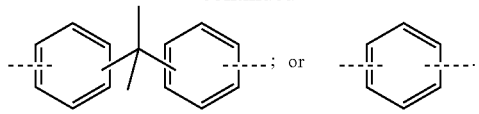

5. A composition comprising an aqueous dispersion of a hydrophobically modified alkylene oxide urethane polymer with pendant or end-capping protonated tertiary amine groups having a $pK_a$ in the range of about 4.5 to about 6.5, wherein the protonated tertiary amine groups are mono- or dihydroxyalkylated dibenzylamine groups.

6. The composition of claim 5 wherein the hydrophobically modified alkylene oxide urethane polymer is a hydrophobically modified ethylene oxide urethane polymer (HEUR) and wherein the protonated tertiary amine groups have a $pK_a$ in the range of about 5.2 to about 6.5.

7. The composition claim 5 wherein the protonated mono- or dihydroxyalkylated dibenzylamine groups are represented by any of the following structures:

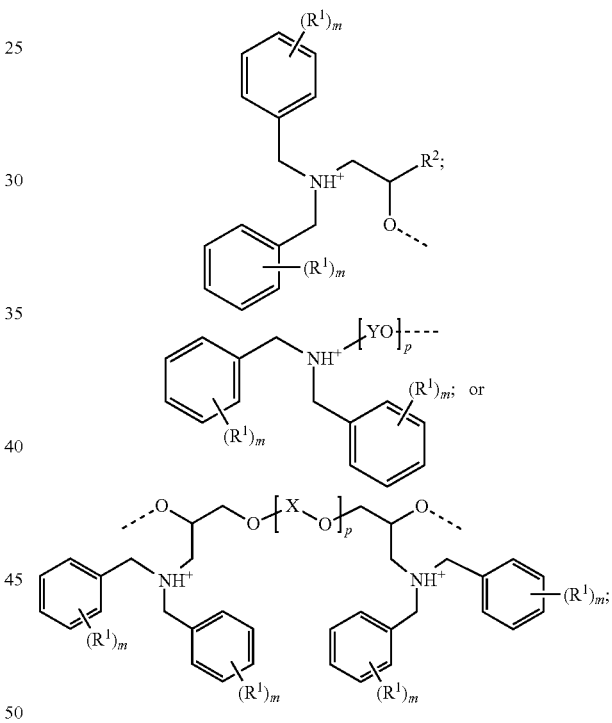

wherein the dashed lines of the structures are the points of attachment where each $R^1$ is independently a $C_1$-$C_6$-carbon-containing substituent;

$R^2$ is H, $C_1$-$C_{20}$-alkyl, or $CH_2$—$OR^3$, wherein $R^3$ is H, $C_1$-$C_{20}$-alkyl, or aryl;

X is $C_1$-$C_{20}$-alkylene, arylene, or aralkylene;

each Y is independently $C_2$-$C_8$-alkylene;

each m is independently 0, 1, or 2; and p is 1 to 50, with the proviso that X is $C_2$-$C_8$-alkylene when p is 2 to 50; and X is $C_1$-$C_{20}$-alkylene, arylene, or aralkylene when p is 1.

8. The composition claim 7 wherein the protonated mono- or dihydroxyalkylated dibenzylamine groups are represented by any of the following structures:

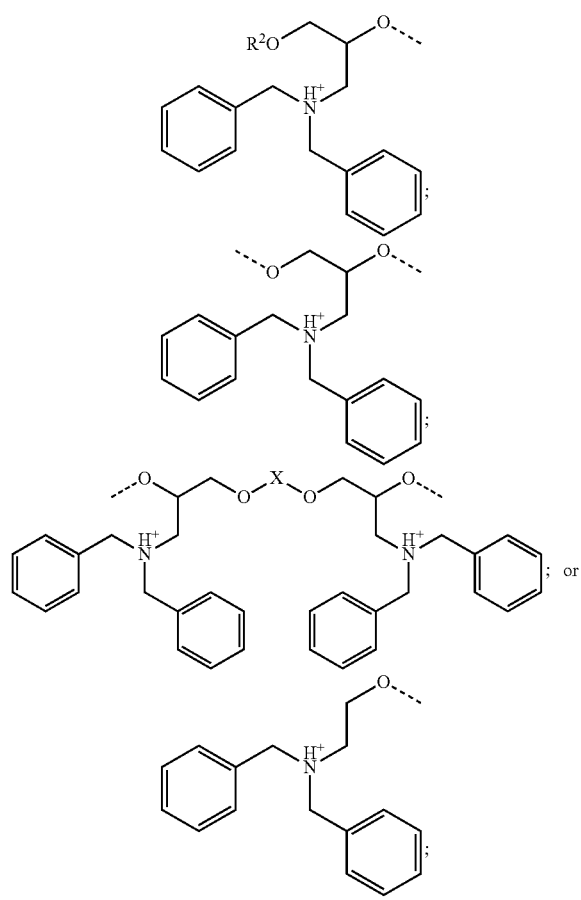
wherein the dashed lines of the structures are the points of attachment
where $R^3$ is n-butyl, isobutyl, ethylhexyl, tridecyl, phenyl, or naphthyl; and
X is —$(CH_2)_4$—; —$CH_2C(CH_3)_2CH_2$—;
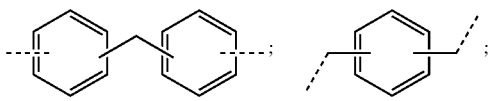
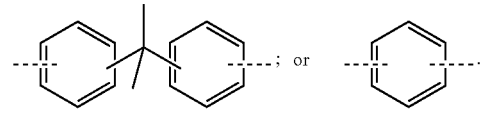
9. The composition of claim 1 which further includes polymer-encapsulated or partially encapsulated opacifying pigment particles.
* * * * *